(12) United States Patent
Ozeki et al.

(10) Patent No.: US 7,216,246 B2
(45) Date of Patent: May 8, 2007

(54) ELECTRONIC APPARATUS AND SUPPLY POWER SETTING METHOD FOR THE APPARATUS

(75) Inventors: Akihiro Ozeki, Ome (JP); Takashi Fujimoto, Ome (JP); Kenji Hibi, Ome (JP); Koji Nakamura, Akiruno (JP); Hideo Kumagai, Yokohama (JP); Ryoji Ninomiya, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 525 days.

(21) Appl. No.: 10/787,861

(22) Filed: Feb. 27, 2004

(65) Prior Publication Data
US 2004/0207267 A1    Oct. 21, 2004

(30) Foreign Application Priority Data
Feb. 28, 2003    (JP)    ............... 2003-053051

(51) Int. Cl.
   G06F 11/30    (2006.01)
   G05B 13/00    (2006.01)
   G01R 31/36    (2006.01)
   H02J 7/00    (2006.01)
   H02J 3/32    (2006.01)
   H02J 9/00    (2006.01)

(52) U.S. Cl. .............. 713/340; 700/297; 702/63; 320/128; 320/138; 307/48; 307/66

(58) Field of Classification Search ........ 713/300, 713/340; 700/286, 297; 702/57, 60, 63; 320/127, 128, 134–138; 340/636.1; 361/681; 307/44, 45, 48
See application file for complete search history.

(56) References Cited

U.S. PATENT DOCUMENTS

| | | | |
|---|---|---|---|
| 4,677,037 A | 6/1987 | Takabayashi | |
| 4,962,462 A | 10/1990 | Fekete | |
| 4,968,566 A | 11/1990 | Lersch et al. | |
| 5,780,980 A | 7/1998 | Naito | |
| 5,916,699 A | 6/1999 | Thomas et al. | |
| 5,964,309 A | 10/1999 | Kimura et al. | |
| 6,028,414 A * | 2/2000 | Chouinard et al. | ......... 320/110 |

(Continued)

FOREIGN PATENT DOCUMENTS

EP    1 091 437 A1    4/2001

(Continued)

OTHER PUBLICATIONS

Japanese Office Action dated Dec. 13, 2005 for Appln. No. 2003-053051.

(Continued)

Primary Examiner—Crystal J. Barnes
(74) Attorney, Agent, or Firm—Pillsbury Winthrop Shaw Pittman, LLP

(57) ABSTRACT

An electronic apparatus according to the invention can be powered by a fuel cell unit and secondary battery unit. Power supply management utility executed by a CPU displays the states of use of the fuel cell unit and secondary battery unit. If a predetermined operation is performed in response to the displayed states, using a pointing device, the power supply management utility permits various types of setting related to the use of the fuel cell unit and secondary battery unit to be performed.

15 Claims, 13 Drawing Sheets

U.S. PATENT DOCUMENTS

| | | | |
|---|---|---|---|
| 6,103,409 A | 8/2000 | Dipierno Bosco et al. | |
| 6,252,511 B1 * | 6/2001 | Mondshine et al. | 340/636.1 |
| 6,326,097 B1 | 12/2001 | Hockaday | |
| 6,381,156 B1 * | 4/2002 | Sakai et al. | 363/65 |
| 6,649,298 B2 | 11/2003 | Hayashi et al. | |
| 6,773,839 B2 * | 8/2004 | Fuglevand et al. | 429/22 |
| 6,910,138 B2 * | 6/2005 | Hayashi et al. | 713/300 |
| 2001/0052433 A1 * | 12/2001 | Harris et al. | 180/68.5 |
| 2002/0055029 A1 | 5/2002 | Hayashi et al. | |
| 2002/0056134 A1 | 5/2002 | Abe et al. | |
| 2003/0142467 A1 | 7/2003 | Hachiya et al. | |
| 2003/0180606 A1 * | 9/2003 | Sasaki et al. | 429/125 |
| 2004/0175598 A1 * | 9/2004 | Bliven et al. | 429/12 |
| 2004/0212345 A1 * | 10/2004 | Ozeki et al. | 320/116 |

FOREIGN PATENT DOCUMENTS

| | | |
|---|---|---|
| EP | 1 233 468 A2 | 8/2002 |
| GB | 1131171 | 10/1968 |
| GB | 1 304 092 | 1/1973 |
| JP | 09-213359 | 8/1997 |
| JP | 10-136574 | 5/1998 |
| JP | 11-154520 | 6/1999 |
| JP | 2001-231109 | 8/2001 |
| JP | 2002-16524 A | 1/2002 |
| JP | 2002-49440 | 2/2002 |
| JP | 2002-63920 | 2/2002 |
| JP | 2002078238 A * | 3/2002 |
| JP | 2002-169629 | 6/2002 |
| JP | 2002-198077 A | 7/2002 |
| JP | 2004273467 A * | 9/2004 |
| WO | WO 98/56058 | 12/1998 |
| WO | WO 01/79012 A2 | 10/2000 |
| WO | WO 01/73879 A1 | 10/2001 |
| WO | WO 2004/031929 A1 | 4/2004 |
| WO | WO 2004/032269 A2 | 4/2004 |

OTHER PUBLICATIONS

Jaesung Han et al., "Direct methanol fuel-cell combined with a small back-up battery," Journal of Power Sources 112, Elsevier Science B.V., p. 477-483, (Aug. 3, 2002).

Kohnosuke Ikeda, "Nenryo Denchi no Subete (All about fuel cell)," Nihon Jitsugyo Shuppan, p. 216-217, (Aug. 20, 2001).

* cited by examiner

ELECTRONIC APPARATUS AND SUPPLY POWER SETTING METHOD FOR THE APPARATUS

CROSS-REFERENCE TO RELATED APPLICATIONS

This application is based upon and claims the benefit of priority from prior Japanese Patent Application No. 2003-053051, filed Feb. 28, 2003, the entire contents of which are incorporated herein by reference.

BACKGROUND OF THE INVENTION

1. Field of the Invention

The present invention relates to a battery managing technique employed in an electronic apparatus on which a plurality of types of battery can be simultaneously mounted.

2. Description of the Related Art

Recently, various types of battery-powered portable electronic apparatus, such as portable information terminals called personal digital assistants (PDAs) and digital cameras, have been developed and are widely used.

Further, great attention has been paid to environmental problems, and environment-friendly batteries are now being actively developed. As batteries of this type, direct methanol fuel cells (DMFCs) are well known.

In DMFCs, methanol is used as a fuel that reacts with oxygen to generate electricity. DMFCs have a structure in which two electrodes, formed of porous metal or carbon, are connected via an electrolyte solution (see, for example, "All about Fuel Cells" by Hiroyuki Ikeda, published by Japan Jitsugyo Publishing, Co., Ltd., Aug. 8, 2001, pp 216–217). Since DMFCs do not generate toxic substances, there is a strong demand that they be used in the above-mentioned electronic apparatus.

For example, a personal computer can now use various types of power sources, such as a conventional external AC power supply, a secondary battery (e.g., a lithium (Li) ion battery), and a DMFC.

Since a personal computer can use a DMFC, secondary battery and AC power supply, it is desirable for users to be able to set, by means of a simple operation, which power source to use, and when to use that power source. Further, when setting the source, it is desirable for users to be able to easily confirm the setting and the source currently in use. In other words, there is a strong demand for a user interface that can display the states of setting and use so that users can grasp it at a glance, and that permits users to make various types of setting by a simple operation.

Conventional electronic apparatuses do not provide such a user interface.

BRIEF SUMMARY OF THE INVENTION

According to an embodiment of the present invention, an electronic apparatus comprises a main unit, a first cell unit equipped with a fuel cell which can supply power to the main unit, a second cell unit equipped with a secondary battery which can supply power to the main unit, a setting unit configured to permit setting concerning supply of power from the first or second cell unit to the main unit, and a display unit displaying a state of supply of power from the first or second cell unit to the main unit, set by the setting unit.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

An embodiment of the present will be described in detail with reference to the accompanying drawings.

Figure 1:
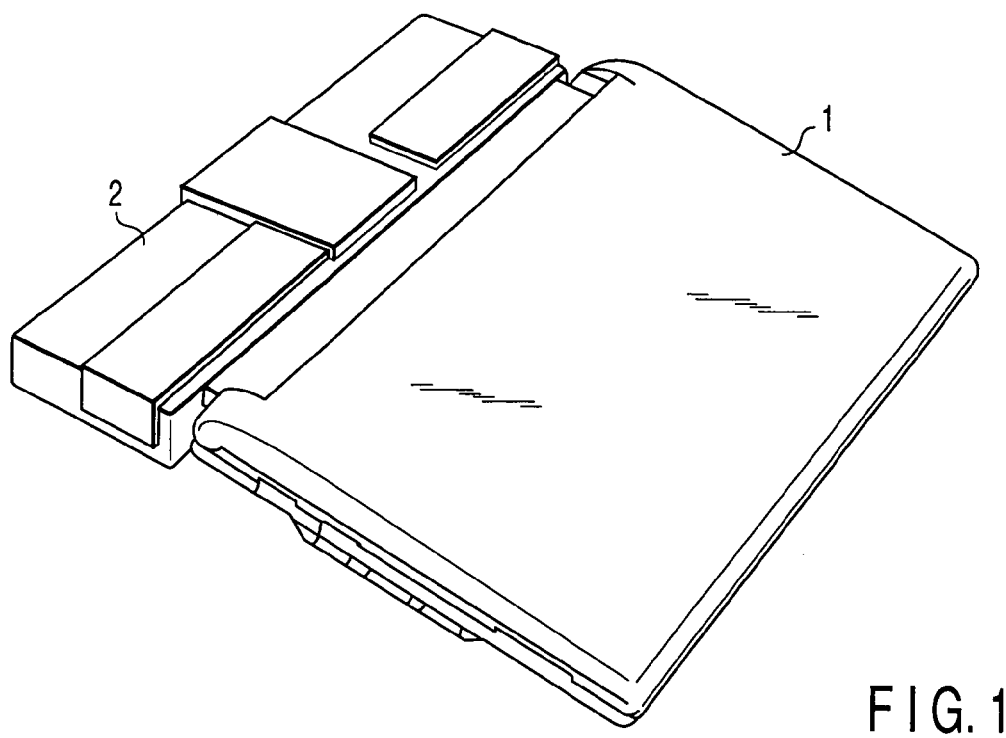
FIG. 1 is a perspective view illustrating the outward appearance of an electronic apparatus system according to an embodiment of the invention.

FIG. 1 is a perspective view illustrating the outward appearance of an electronic apparatus system according to the embodiment of the invention.

As seen from FIG. 1, this electronic apparatus system comprises an electronic apparatus 1, such as a notebook-type personal computer, and a fuel cell unit 2 detachably attached to the back of the apparatus 1. The fuel cell unit 2 is a power supply device for supplying power to the electronic apparatus 1, and contains a DMFC for generating electrical energy by reacting, with oxygen, methanol contained therein as a fuel.

The electronic apparatus 1 and fuel cell unit 2 have their respective connectors to be connected, when necessary, to an AC cord for supplying AC power from an external power supply (AC power supply).

Figure 2:
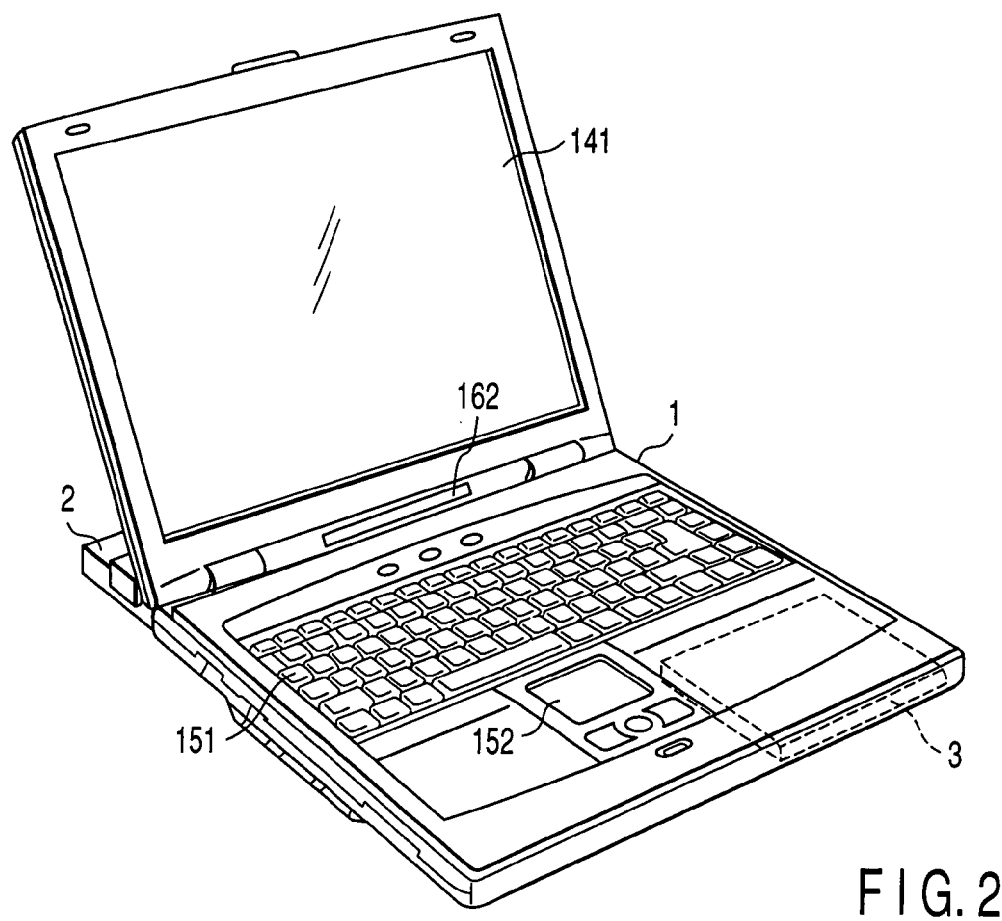
FIG. 2 is a perspective view illustrating the outward appearance of an electronic apparatus incorporated in the electronic apparatus system of FIG. 1, viewed when the lid is open.

FIG. 2 is a perspective view illustrating the outward appearance of the electronic apparatus 1, viewed when the lid is open.

As seen from FIG. 2, the lid section of the electronic apparatus 1 is attached to the main unit of the apparatus by a hinge mechanism, so that it can be opened and closed. The lid section has a liquid crystal display (LCD) 141 in its inner wall surface. The main unit, to which the lid section is attached, has a sub-LCD 162 for plain display.

The main unit comprises a keyboard 151 for inputting characters, symbols, etc. to the input screen of the LCD 141, and a pointing device 152 for moving a mouse cursor displayed to point an arbitrary position on the LCD 141 and select the position. A secondary battery unit 3 that contains a repeatedly chargeable secondary battery is dismountably mounted in the bottom section of the main unit.

Thus, the electronic apparatus system can use, as power supply devices, the AC power supply that can be connected thereto via the AC cord connected to the electronic apparatus 1 or fuel cell unit 2, the fuel cell unit 2 attached to the apparatus 1, and the secondary battery unit 3 mounted in the apparatus 1. This electronic apparatus system can display that the current states of use of the power supply devices in an easily understandable manner, and can easily switch the power supply devices from one to another. These will be described in detail.

Figure 3:
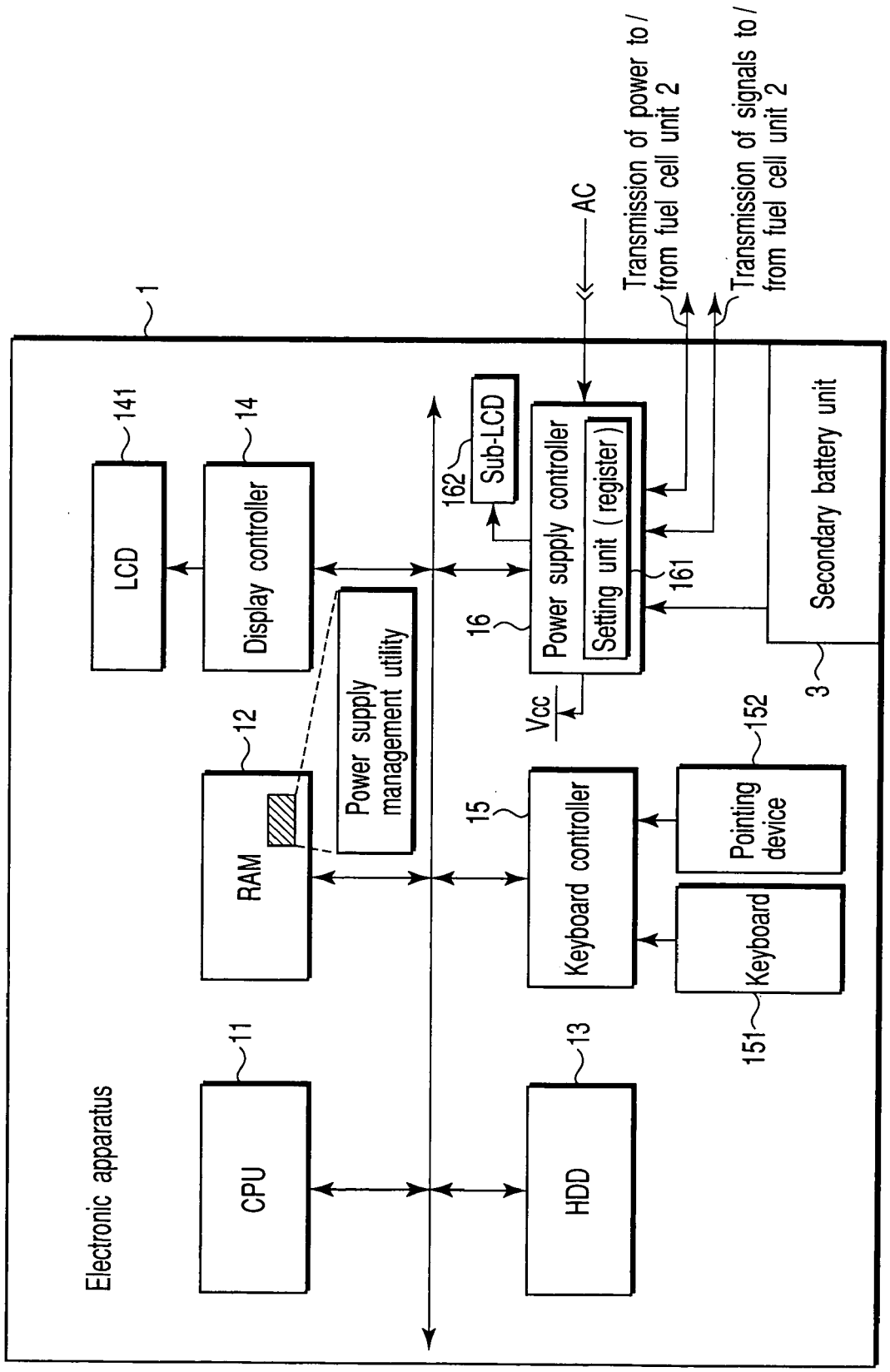
FIG. 3 is a block diagram schematically illustrating the structure of the electronic apparatus system.

FIG. 3 schematically shows the structure of the electronic apparatus 1.

As shown in FIG. 3, the electronic apparatus 1 comprises a CPU 11, RAM 12, HDD 13, display controller 14, keyboard controller 15 and power supply controller 16 connected to each other via a system bus.

The CPU 11 controls the entire electronic apparatus 1. For this purpose, the CPU 11 executes various programs stored in the RAM 12, such as the operating system, utility software, application software, etc.

The RAM 12 is a storage medium that serves as a work area for the CPU 11, and stores various programs executed by the CPU 11, and various types of data used when the programs are executed. On the other hand, the HDD 13 is a nonvolatile storage medium of a large capacity that serves as the auxiliary memory unit of the electronic apparatus 1, and stores a large number of programs and a large amount of data.

The display controller 14 controls the output of a user interface incorporated in the electronic apparatus 1, and controls the display on the LCD 141 of the image data processed by the CPU 11. The keyboard controller 15 controls the input of the user interface, and transmits the contents of operations, made by the keyboard 151 or pointing device 152, to the CPU 11 via built-in registers.

The power supply controller 16 controls the supply of power to each section of the electronic apparatus 1. The controller 16 has a function for acquiring power from the AC power supply, fuel cell unit 2 and secondary battery unit 3, and transmitting/receiving various signals to/from a microcomputer 21, described later, of the fuel cell unit 2. Further, the power supply controller 16 contains a register 161 for setting how to use the AC power supply, fuel cell unit 2 and secondary battery unit 3. In response to an instruction from utility software (power supply management utility) executed by the CPU 11, the controller 16 updates various set values stored in the register 161. The register 161 also stores information indicative of the current power supply state of the entire electronic apparatus system. Referring to this information, the power supply management utility detects the current power supply state of the entire electronic apparatus system. The register 161 stores information concerning the operation state of the fuel cell unit 2 and the residual quantity of the secondary battery unit 3, as well as information as to whether or not the AC power supply is connected, whether or not the fuel cell unit 2 is connected, whether or not the secondary battery unit 3 is connected, etc.

The power supply management utility is a program that provides a user interface for displaying, on the LCD 141, the states of use of the AC power supply, fuel cell unit 2 and secondary battery unit 3, and permitting a user to input, on the LCD, various types of setting related to the states of use. The power supply controller 16 also has a function for displaying the states of use of the power supply devices on the sub-LCD 162 in a simple manner.

Furthermore, the power supply controller 16 can supply power to the fuel cell unit 2 and secondary battery unit 3.

Figure 4:
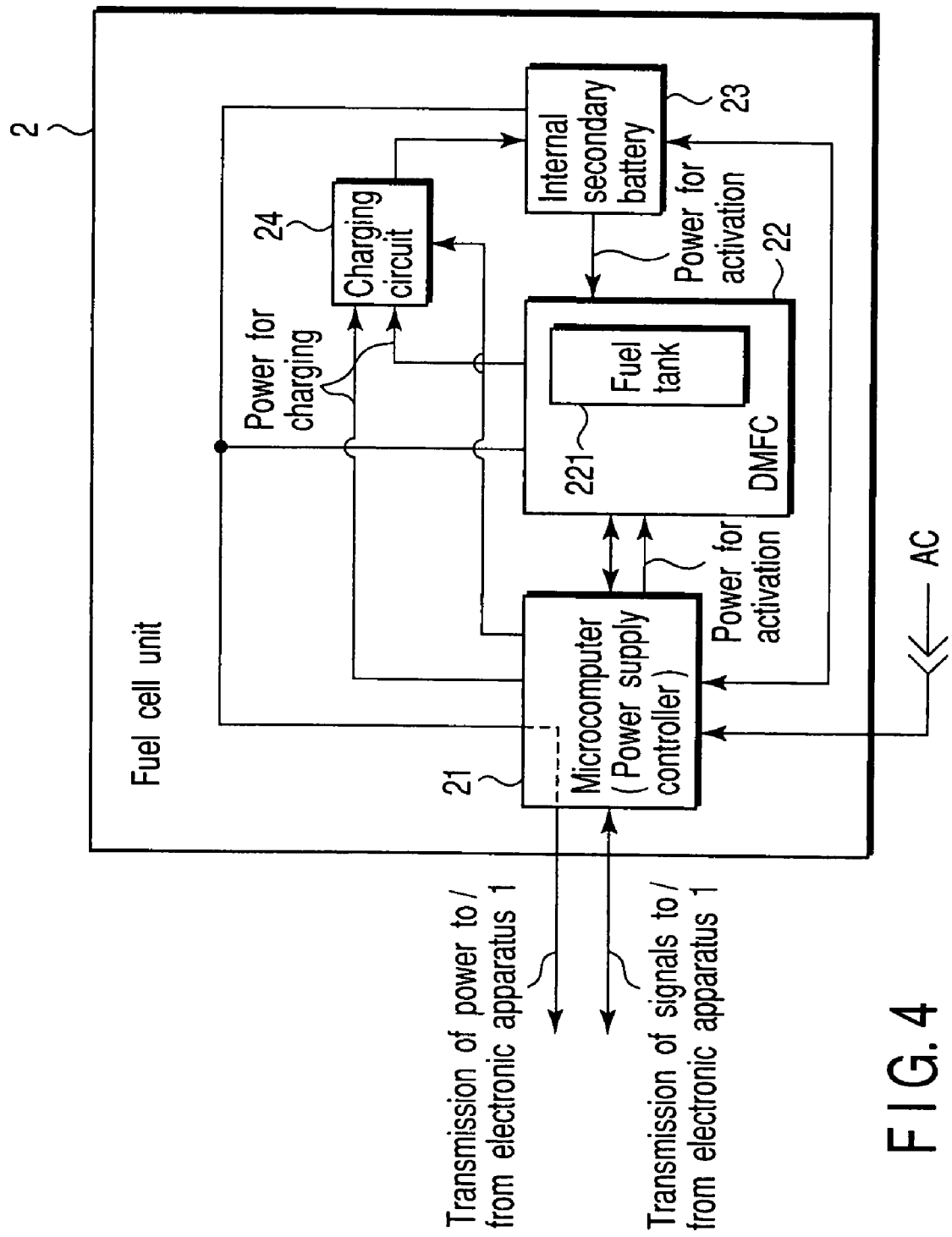
FIG. 4 is a block diagram schematically illustrating the structure of a fuel cell unit incorporated in the electronic apparatus system.

FIG. 4 is a block diagram schematically illustrating the structure of the fuel cell unit 2.

As seen from FIG. 4, the fuel cell unit 2 comprises a microcomputer 21, DMFC 22, internal secondary battery 23 and charging circuit 24.

The microcomputer 21 controls the entire fuel cell unit 2, and transmits and receives various signals to/from the power supply controller 16 of the electronic apparatus 1. The microcomputer 21 also serves as a fuel-cell-unit-side power supply controller, and has a function for supplying the power of the DMFC 22 and internal secondary battery 23 to the electronic apparatus 1, and a function for supplying the DMFC 22 and internal secondary battery 23 with the power from the AC power supply and electronic apparatus 1.

The DMFC 22 generates electrical energy by reacting, with oxygen, methanol contained therein as a fuel. The DMFC 22 has a slot that houses a detachable fuel tank 221. The DMFC 22 is a so-called auxiliary machine type DMFC that positively draws methanol from the fuel tank 221 or air using, for example, a pump (auxiliary machine). The DMFC 22 assigns part of the power generated to the operation of the auxiliary machine.

The internal secondary battery 23 is, for example, a lithium ion cell that can be repeatedly charged, during the activation of the DMFC 22, with the power needed for the auxiliary machine. In response to an instruction from the microcomputer 21, the charging circuit 24 charges the internal secondary battery 23 with the power generated by the DMFC 22 or supplied from the electronic apparatus 1. Further, the internal secondary battery 23 can be used to make up a shortfall in power when higher power than the output of the DMFC 22 is instantly required.

Figure 5:
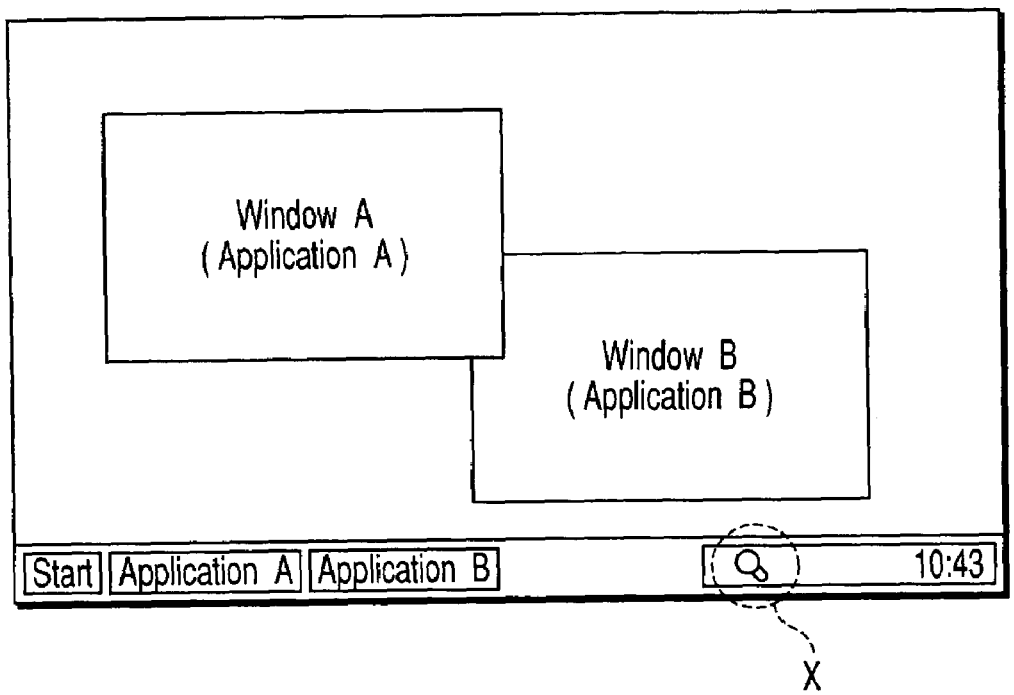
FIG. 5 is a view illustrating a display example on the LCD of the electronic apparatus system.

A description will be given of a user interface provided by the electronic apparatus system using the power supply management utility. FIG. 5 is a view illustrating a display example on the LCD 141 of the electronic apparatus 1.

In the case of FIG. 5, two types of application software A and B are operating, and their respective windows A and B are displayed on the screen. Below the screen, an area called a task bar is provided, on which buttons are displayed for permitting a user to call the applications A and B when they are clicked.

An area called a task tray is provided at the rightmost portion of the task bar. Since the task tray displays, for example, an icon for indicating the state of the resident software operating in the background, it is also called an indicator area. In the electronic apparatus system, the power supply management utility operates in the background, and an icon (X) indicative of the activation of the power supply management utility is displayed on the task tray.

Figure 6:
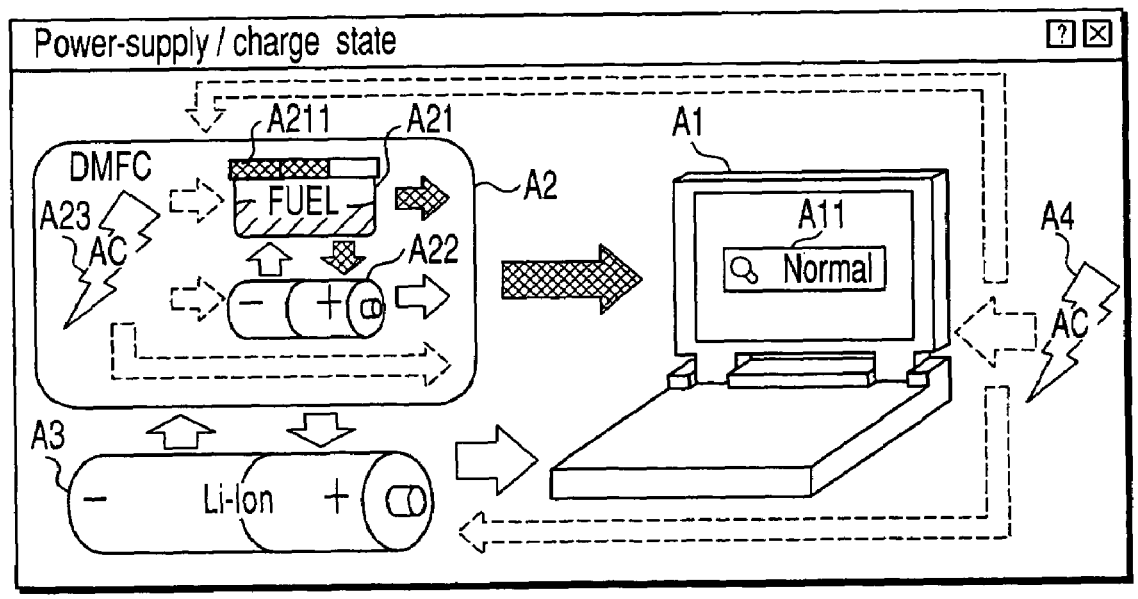
FIG. 6 is a view illustrating a power-supply/charge state displayed by the electronic apparatus system.

When the icon (X) displayed on the task tray is clicked by the pointing device 152, the power supply management utility requests the operating system to display, on the LCD 141, the power-supply/charge state display window as shown in FIG. 6. As well as the window display on the LCD 141 requested by the power supply management utility, the operating system controls all processes including report of operations on the display using the pointing device 152 to the management utility. Therefore, no further description is given of the control of the operating system.

As shown in FIG. 6, the power-supply/charge state display window displayed by the power supply management utility displays marks A1, A2 and A3 that schematically express the electronic apparatus 1, fuel cell unit 2 and secondary battery unit 3, respectively. These marks will now be referred to as components (component images). The window also displays components A4, A23, A21 and A22. The component A4 indicates the AC power input from the electronic apparatus 1, the component A23 indicates the AC power input via the AC power supply connector of the fuel cell unit 2, and the components A21 and A22 indicate the DMFC 22 of the fuel cell unit 2 and the internal secondary battery 23, respectively.

The power supply utility accesses the register 161 of the power supply controller 16, thereby detecting the present power supply state of the entire electronic apparatus system, and expressing the detection result in the form of arrows (power supply image) between the components. In the example of FIG. 6, the arrows directed from the component A4 to the other components are displayed in a first form (i.e., displayed by broken lines). The arrows directed from the component A23 to the other components are also displayed in the first form. The first form means that the components A4 and A23 cannot supply power. From the first form, users instantly understand that no AC cord is connected to the electronic apparatus 1 and fuel cell unit 2.

The arrow directed from the component A2 to the component A1 is displayed in a second form (i.e., displayed by a solid line, hatched). Furthermore, the arrow directed from the component A3 to the component A1 is displayed in a third form (i.e., displayed by a solid line, not hatched). These arrows indicate that the component A2 is currently supplying power to the component A1, and the component A3 can supply power to the component A1. From these arrows, users instantly understand that both the fuel cell unit 2 and secondary battery unit 3 are mounted, and the fuel cell unit 2 is now supplying power to the electronic apparatus 1. Instead of using hatching, the arrows may be made luminous or colored.

As described above, when the power supply device (the AC power supply, fuel cell unit 2, secondary battery unit 3) is supplying power to the electronic apparatus 1, the arrow directed from each component (A2, A3, A4) to the component A1 (indicating the electronic apparatus 1) is displayed by "a solid line", "hatched". Further, if the power supply device can supply power to the component A1 but is not supplying power thereto, the arrow directed from the power supply device to the component A1 is displayed by "a solid line", "not hatched". If the power supply device cannot supply power to the component A1, the arrow therebetween is displayed by "a broken line".

Furthermore, the arrows directed from the components A21 and A22 of the component A2 to the component A1 are displayed in the combinations of the second and third forms. From this, it is understood, in the case of FIG. 6, that only the DMFC 22 in the fuel cell unit 2 is supplying power. Further, since the arrow directed from the component A22 indicative of the internal secondary battery 23 to the component A21 is displayed by "a solid line", "non hatched", it is understood that power can be supplied from the internal secondary battery 23 to the auxiliary machine of the DMFC 22. The arrow directed from the component A22 to the component A1 is also displayed by "a solid line", "non hatched", it is understood that power can also be supplied from the internal secondary battery 23 to the electronic apparatus 1. From the two arrows between the components A21 and A22 show that the internal secondary battery 23 is charged with the power of the DMFC 22.

Moreover, the two arrows between the components A2 and A3 are displayed in the third form, which shows that power can be supplied from the fuel cell unit 2 to the secondary battery unit 3 or vice versa, but no such supply of power is performed. Power is supplied from the secondary battery unit 3 to the fuel cell unit 2 when, for example, power is supplied to the auxiliary machine of the DMFC 22 in the unit 2 to activate the DMFC 2, or when power is supplied to charge the internal secondary battery 23. On the other hand, power is supplied from the fuel cell unit 2 to the secondary batter unit 3 when, for example, the secondary battery unit 3 is charged with the power generated by the DMFC 22.

The component A1 displays plate A11 indicative of the operation mode in which the electronic apparatus 1 is operating. The operation mode determines the balance between the performance of the apparatus 1 and power saving. FIG. 6 shows that "normal" operation mode is now selected. The operation mode of the electronic apparatus 1 also includes "power saving" mode for suppressing power consumption (in which, for example, the brightness of the LCD 141 and the processing speed of the CPU are reduced), and "high-performance" mode (in which the brightness of the LCD 141 and the processing speed of the CPU are set maximum). The "normal" mode is positioned between the "power saving" mode and "high-performance" mode. In the "normal" mode, if the keyboard 151 or pointing device 152 is not operated during a predetermined period, the motor for driving the disks of an HDD 13 is kept OFF, and/or the brightness of the LCD is reduced.

The DMFC 22 of the fuel cell unit 2 can increase its output level in a stepwise manner in response to an instruction from the microcomputer 21. The power-supply/charge state display window can display the output level using an indicator A211 displayed at the upper portion of the component A21 indicative of the DMFC 22. In this case, assuming that the DMFC 22 can change its output in three stages, the indicator A211 is divided into three cells that enable three output levels to be recognized. In the example of FIG. 6, two cells of the indicator A211 are hatched, which indicates that the middle output level is performed. If all cells of the indicator A211 are hatched, it indicates the high output level, whereas if only one cell is hatched, it indicates the low output level. Further, if no cells are hatched, the output level of the DMFC 22 is 0, i.e., the DMFC 22 is stopped.

Figure 7:
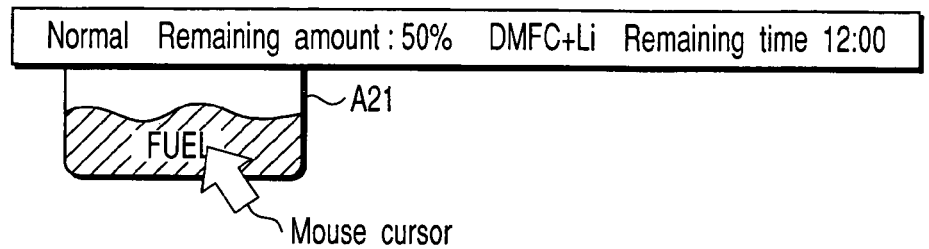
FIG. 7 is a view illustrating information displayed by the electronic apparatus system when a cursor is put on a predetermined position.

When the mouse cursor is put by the pointing device 152 on one of the display areas of the components A1, A2 and A3, the power supply management utility displays the information as illustrated in, for example, FIG. 7. FIG. 7 shows a display example obtained when the mouse cursor is put on the component A21 of the component A2. This information indicates the operation mode, remaining amount, power supplies, remaining operation time in this order from the left. The remaining amount indicates the remaining fuel amount of the fuel tank 221. However, if the cursor is put on the component A1, the remaining amount section is blank. If the cursor is put on the component A3, the remaining amount indicates that of the secondary battery.

As described above, the power-supply/charge state display window set by the power supply management utility displays the states of use of the fuel cell unit 2, secondary battery unit 3 and AC power supply so that users can understand them at a glance. Further, the power-supply/charge state display window enables the users to execute various types of setting related to the use of the power supply devices. A description will be given of various types of setting related to the use of the power supply devices.

(1) Display of Power Supply Setting Window

Figure 8:
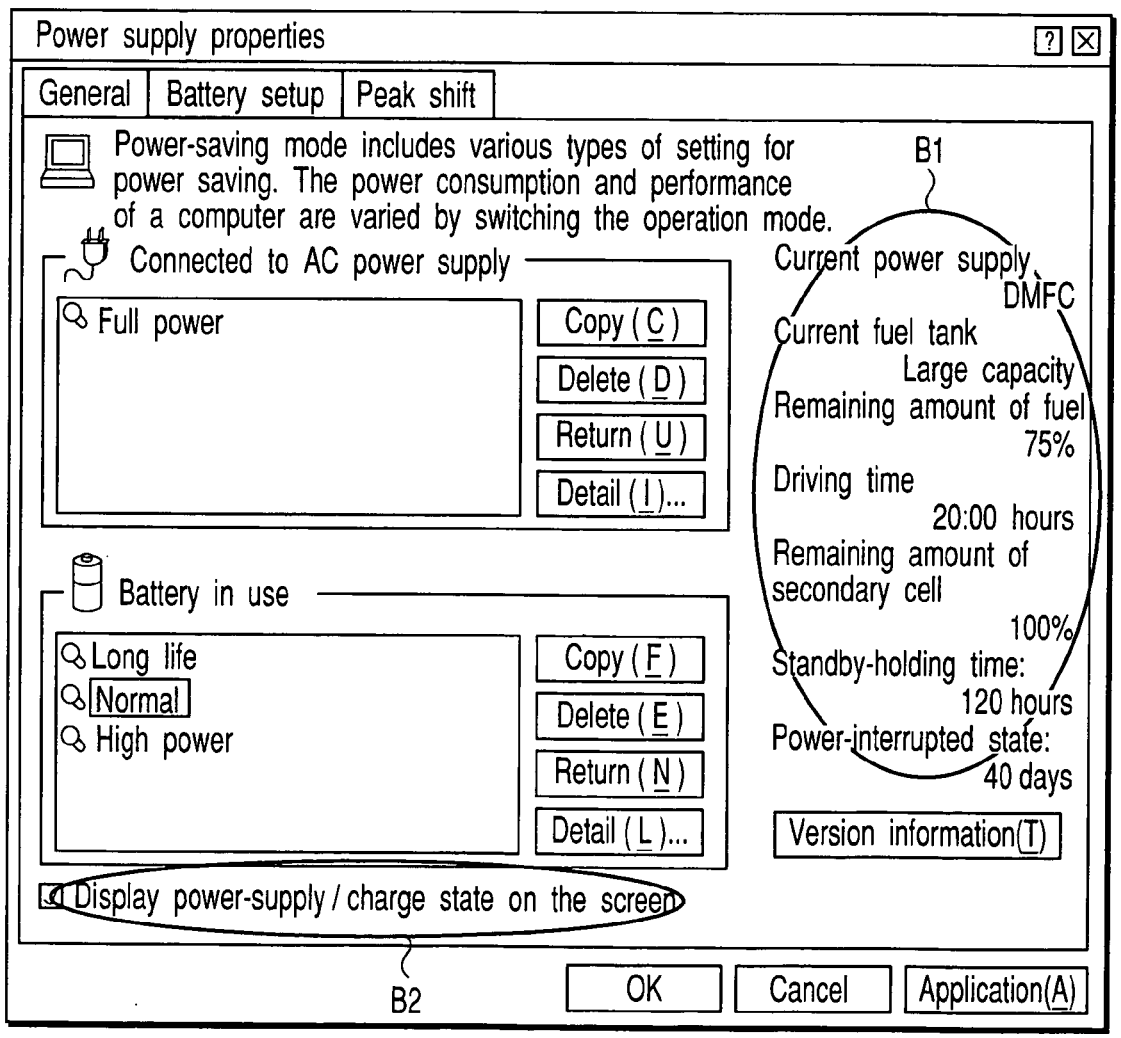
FIG. 8 is a view illustrating a power-setting window displayed by the electronic apparatus system.

When one of the display areas of the components A1, A2 and A3 is clicked, the power supply management utility displays the power supply setting window as shown in FIG. 8. This window permits users to perform setting for power supply in the electronic apparatus system. This window displays the state of the currently used power supply (B1), and permits the users to perform setting as to the display/non-display of an icon (X) in the task tray (B2).

If a change occurs in the state of use of one of the power supply devices after the operation made on the power supply setting window, the power supply management utility updates the contents of the supply/charge state display screen in accordance with the change (the same can be said of various types of setting described later).

(2) Start/Stop of DMFC 22

Figure 9:
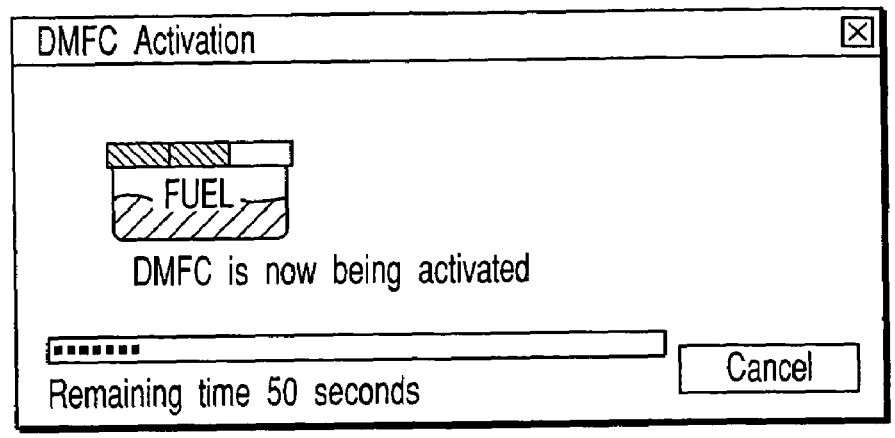
FIG. 9 is a view illustrating the remaining time till activation of a DMFC, displayed by the electronic apparatus system.

If the indicator A211 indicates that the output level of the DMFC 22 is 0, the DMFC 22 is stopped. At this time, users can request the activation of the DMFC 22 by clicking the display area of the component A21. Upon receiving the request, the power supply management utility supplies an instruction to activate the DMFC 22 to the microcomputer 21 of the fuel cell unit 2 via the power supply controller 16, and displays, on the LCD 141 as shown in FIG. 9, the time left before the activation of the DMFC 22 finishes. Conversely, users can stop the operating DMFC 22 by clicking the display area of the component A21.

(3) Output Level of DMFC 22

Users can request a change in the output level of the DMFC 22 by clicking the display area of the indicator A211. Upon receiving the request, the power supply management utility can change the output level of the DMFC 22 between the above-mentioned three levels (high, middle and low levels).

(4) Peak Shift Users can perform setting related to peak shift by clicking the display area of the component A4 or A23. "Peak shift" means the shift of the power supply device from the AC power supply to a battery or fuel cell during, for example, the daytime in which power is concentrically demanded. Upon receiving a request to perform this setting, the power supply management utility displays a window for setting the time zone in which the power supply device is shifted.

(5) Operation Mode

Users can change the operation mode by clicking the display area of the plate A11 in the component A1. Upon receiving a request to change the operation mode, the power supply management utility changes the operation mode. At this time, if the users request, the power supply management utility displays a window that shows the balance between the performance and power saving of the electronic apparatus 1 at the present operation mode (normal mode).

(6) Supply of Power from the Fuel Cell Unit 2, Secondary Battery Unit 3 to Electronic Apparatus 1

Figure 10:
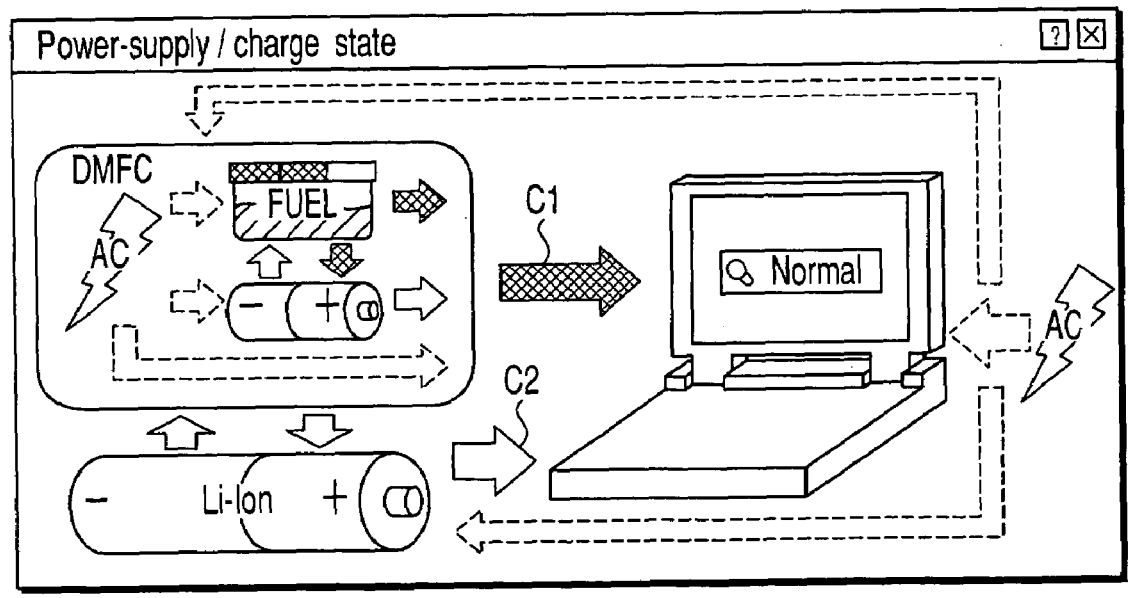
FIG. 10 is a view for explaining setting related to supply of power from a fuel cell unit or secondary battery unit to an electronic apparatus incorporated in the system, which can be performed by the electronic apparatus system.
Figure 11:
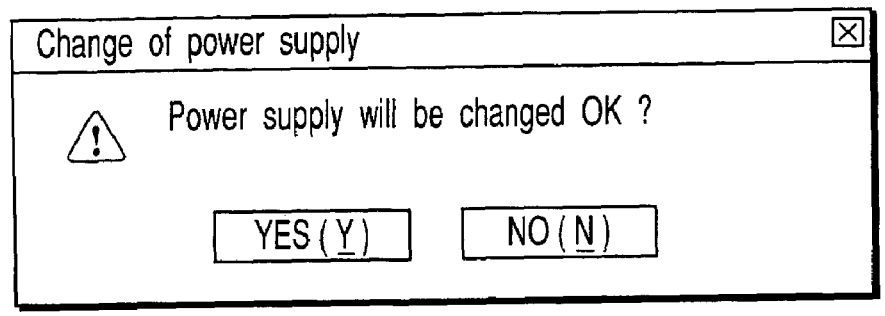
FIG. 11 is a view illustrating a confirmation display example of the electronic apparatus system.

Users can change the power supply device for the electronic apparatus 1 by clicking the display area indicated by arrow C1 or C2 shown in FIG. 10. At present, power is supplied from the fuel cell unit 2 to the apparatus 1. If the display area of arrow C2 is clicked, the power supply management utility displays the confirmation window shown in FIG. 11 to make the users confirm the switching of the power supply device, and then switches the power supply device to the secondary battery unit 3.

(7) Charging of Secondary Battery Unit 3

Figure 12:
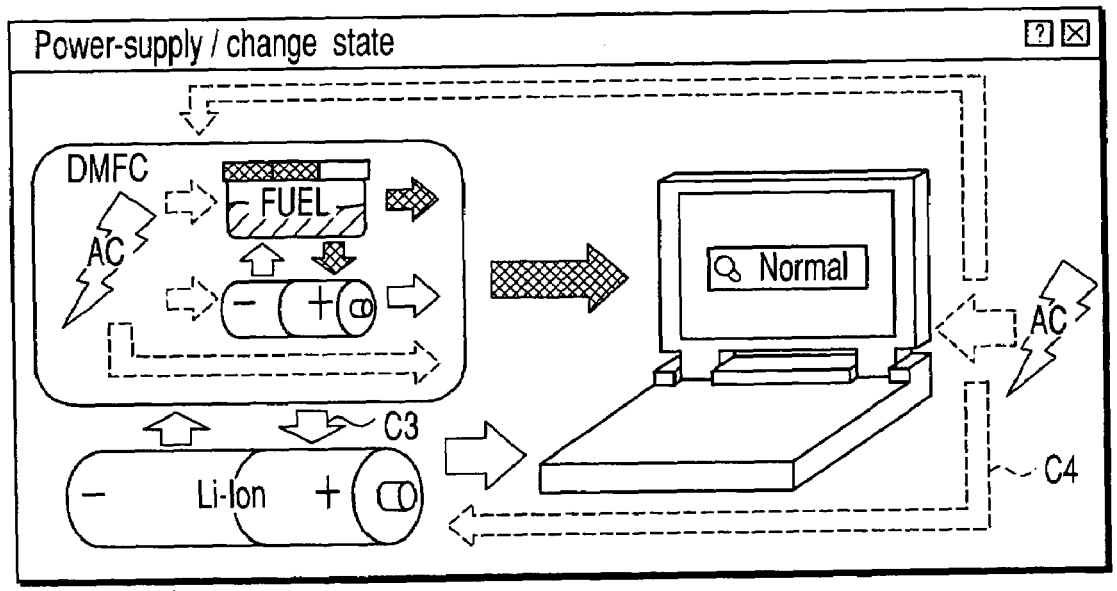
FIG. 12 is a view for explaining setting for charging a secondary battery unit, which can be performed by the electronic apparatus system.

Users can select one of the AC power supply and fuel cell unit 2 as the power supply device for charging the secondary battery unit 3, by clicking the display area of arrow C3 or C4 shown in FIG. 12. If, for example, the display area of arrow C3 is clicked, the power supply management utility sets the fuel cell unit 2 as the power supply device for charging the secondary battery unit 3 with the power generated by the fuel cell unit 2.

(8) Supply of Power for Activation of DMFC 22

Figure 13:
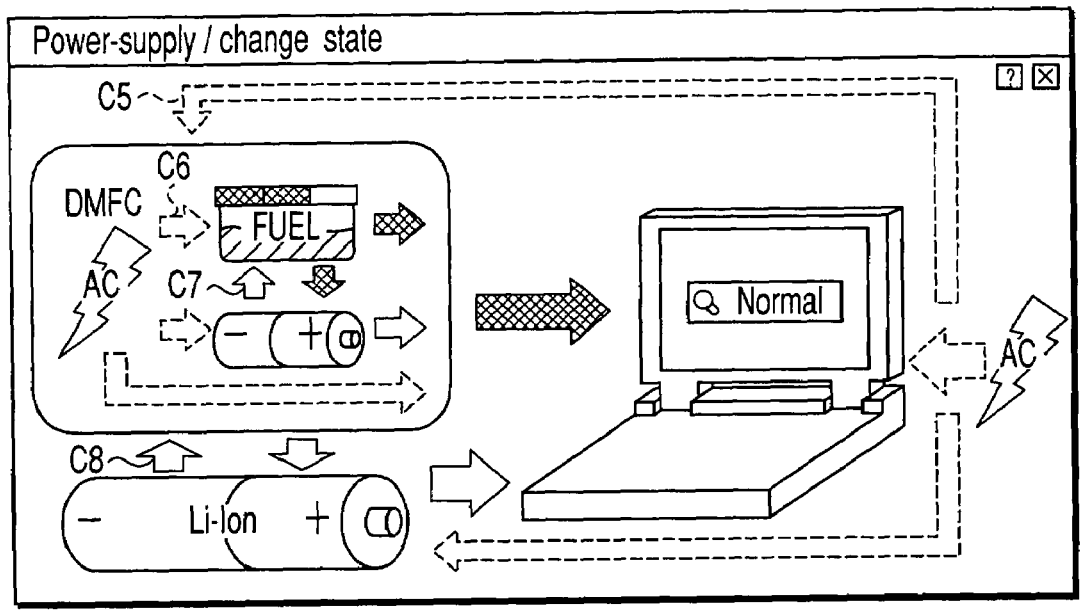
FIG. 13 is a view for explaining setting for, for example, supply of power during the activation of a DMFC, which can be performed by the electronic apparatus system.

Users can select the power supply device for supplying power to the auxiliary machine of the DMFC 22 to activate the DMFC 22, by clicking the display area of C5, C6, C7 or C8 shown in FIG. 13. If, for example, the display area of arrow C7 is clicked, the power supply management utility sets the internal secondary batter 23 as the power supply device. The supply of power is finished when the DMFC 22 reaches a state in which it can output predetermined or more power. At this time, the power supply management utility permits the users to select one of the fuel cell unit 2 and the secondary battery unit 3 as the power supply device for activating the electronic apparatus 1. As a result, users can set the electronic apparatus system, for example, so that firstly, the secondary battery unit 3 is used to quickly activate the electronic apparatus 1, and then the fuel cell unit 2 is used to operate the apparatus 1 after the DMFC 22 is activated.

(9) Dealing with Peak Power Using DMFC

Figure 14:
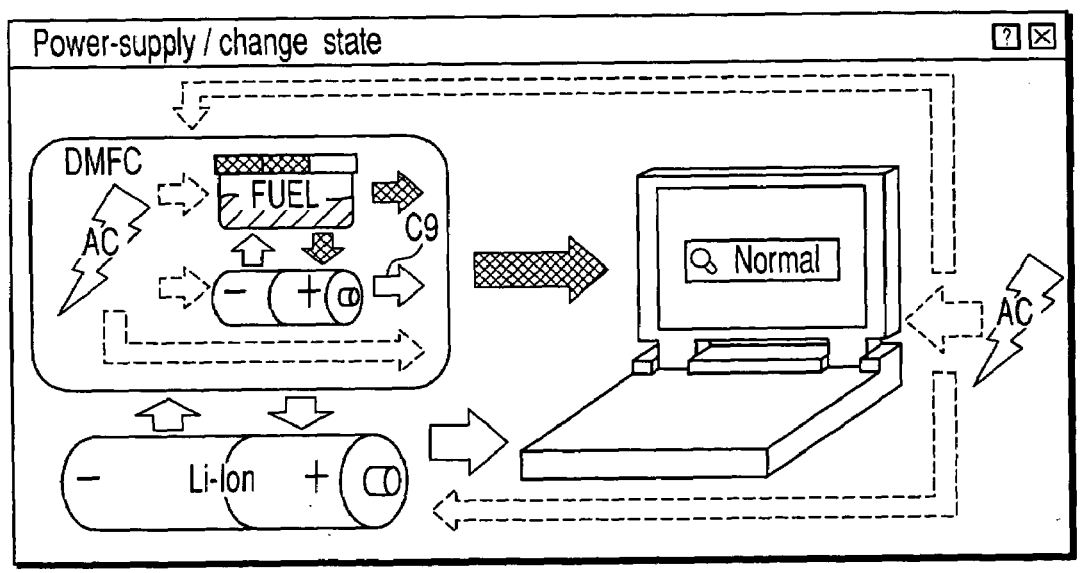
FIG. 14 is a view for explaining setting for dealing with peak power using the DMFC, which can be performed by the electronic apparatus system.

Users can select whether or not to cover a shortfall in power using the power generated by the internal secondary battery 23, by clicking the display area of arrow C9 shown in FIG. 14, when higher power than the output of the DMFC 22 is instantly required. If this covering is not selected, the shortfall is made up by, for example, the power generated by the secondary battery unit 3.

(10) Charge of Internal Secondary Battery 23

Figure 15:
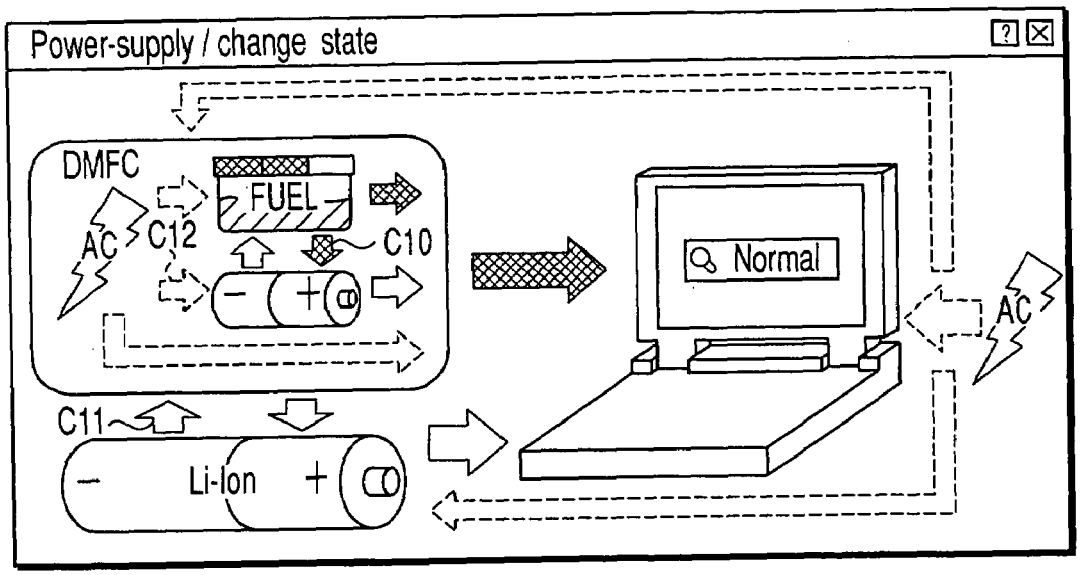
FIG. 15 is a view for explaining setting for the charging control of an internal secondary battery, which can be performed by the electronic apparatus system.

Users can control the charge of the internal secondary battery 23 using the DMFC 22 in the fuel cell unit 2, by clicking the display area of arrow C10 shown in FIG. 15. In the state shown in FIG. 15, the internal secondary battery 23 is being charged by the DMFC 22. If the display area of arrow C10 is clicked, the power supply management utility stops the charging. After that, if the display area of arrow C10 is clicked again, the power supply management utility resumes the charging.

Further, if the display area of arrow C11 is clicked, the power supply management utility is instructed to charge the internal secondary battery 23 with the power generated by the secondary battery unit 3. Similarly, if the display area of arrow C12 is clicked, the power supply management utility is instructed to charge the internal secondary battery 23 with the power supplied from the power supply connected to the fuel cell unit 2 via the AC cord.

(11) Power Supply Control of DMFC 22 During Connection of AC Cord

Figure 16:
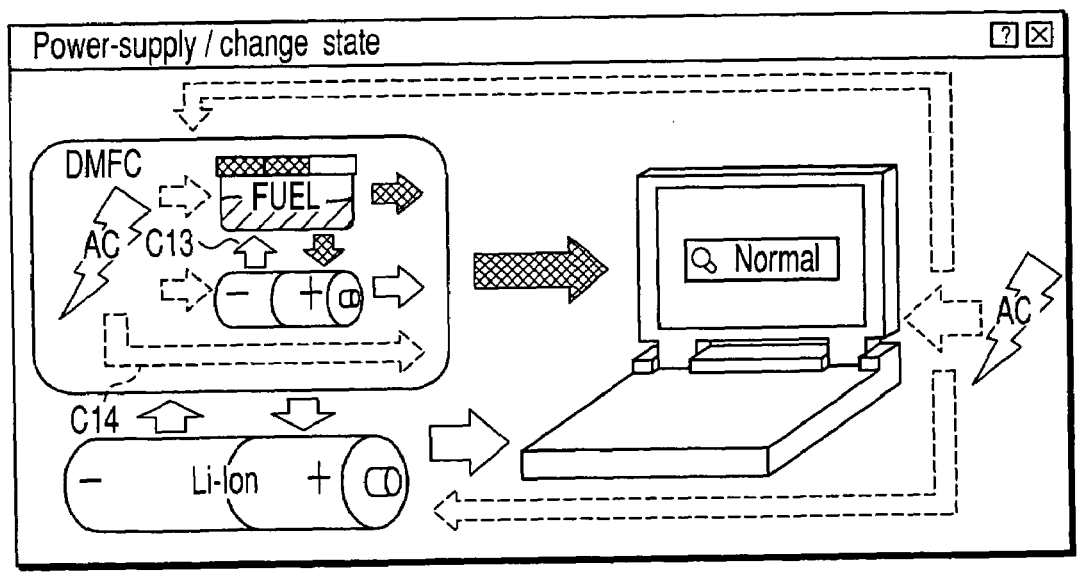
FIG. 16 is a view for explaining setting for power supply control when the DMFC is connected to an AC cord, which can be performed by the electronic apparatus system.

When the AC power supply can be used for the fuel cell unit 2 via the AC cord connected to the unit 2, users can select whether or not to charge the internal secondary battery 23 with the power from the AC power supply, by clicking the display area of arrow C13 shown in FIG. 16. Further, if the display area of arrow C14 is clicked, it is selected whether or not to supply power from the AC power supply to the electronic apparatus 1.

As described above, the electronic apparatus system provides a user interface that enables users to confirm the states of use of the fuel cell unit 2, secondary battery unit 3 and AC power supply. This user interface also enables the users to perform various types of setting related to the use of these power supply devices and related to the charging of the internal secondary battery 23.

Figure 17:
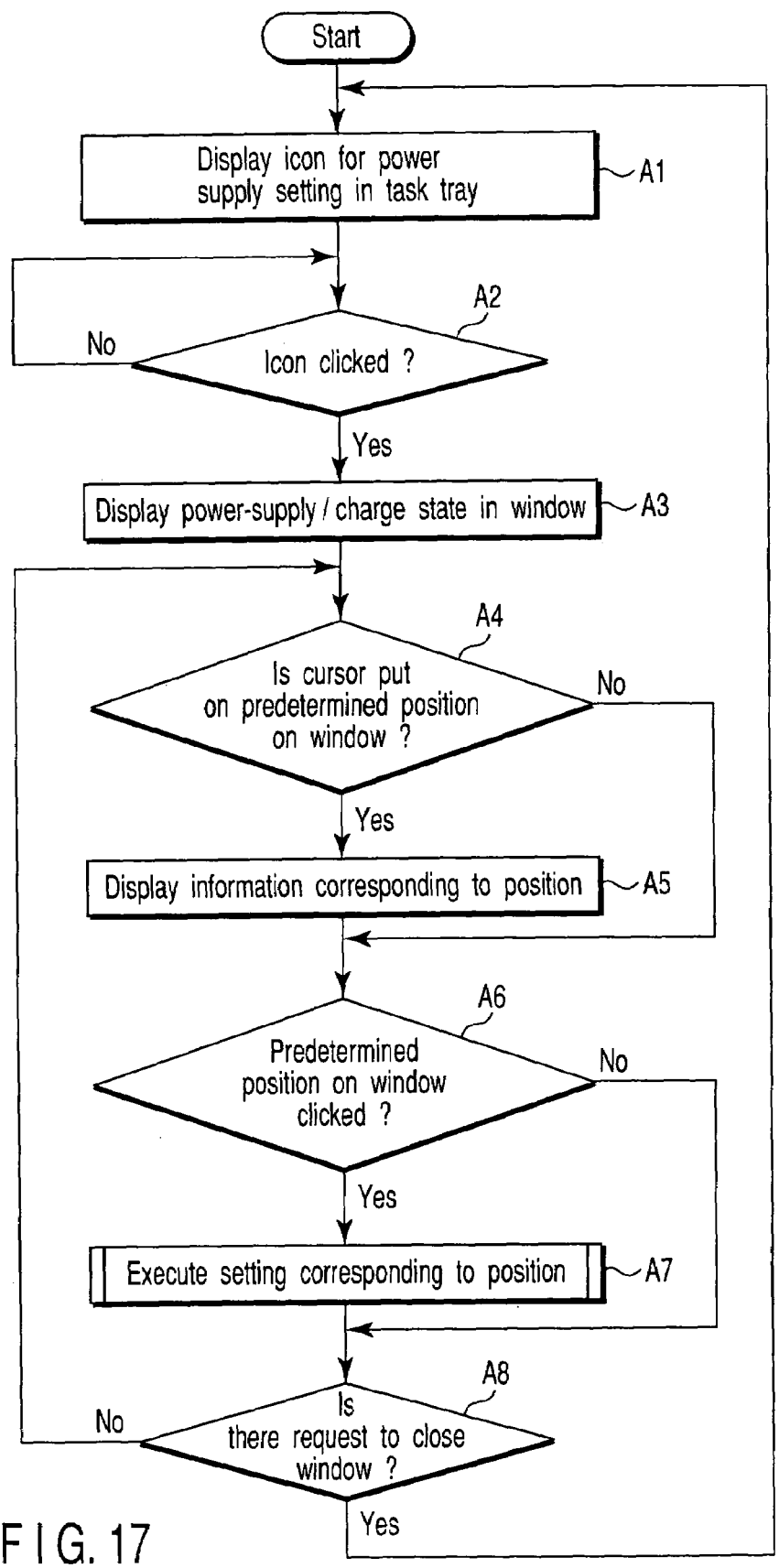
FIG. 17 is a flowchart illustrating the control of the electronic apparatus system related to setting for power supply.

FIG. 17 is a flowchart illustrating the control of the electronic apparatus system related to setting for power supply.

In the electronic apparatus system, an icon for power supply setting is displayed in the task tray area provided at the lower right end of the LCD 141 (step A1). When this icon is clicked (YES in step A2), the power supply management utility displays, in a window, a power-supply/charge state to be edited (step A3).

Further, when a cursor is put on a predetermined position on the power-supply/charge state display window (YES in step A4), the power supply management utility displays information corresponding to the position as shown in FIG. 7 (step A5). Furthermore, when a predetermined position on the power-supply/charge state display window is clicked (YES in step A6), the power supply management utility performs setting corresponding to the clicked position (step A7).

When a request to close the power-supply/charge state display window is made (YES in step A8), the power supply management utility closes the window and again displays the icon (X) in the task tray display area.

Figure 18:
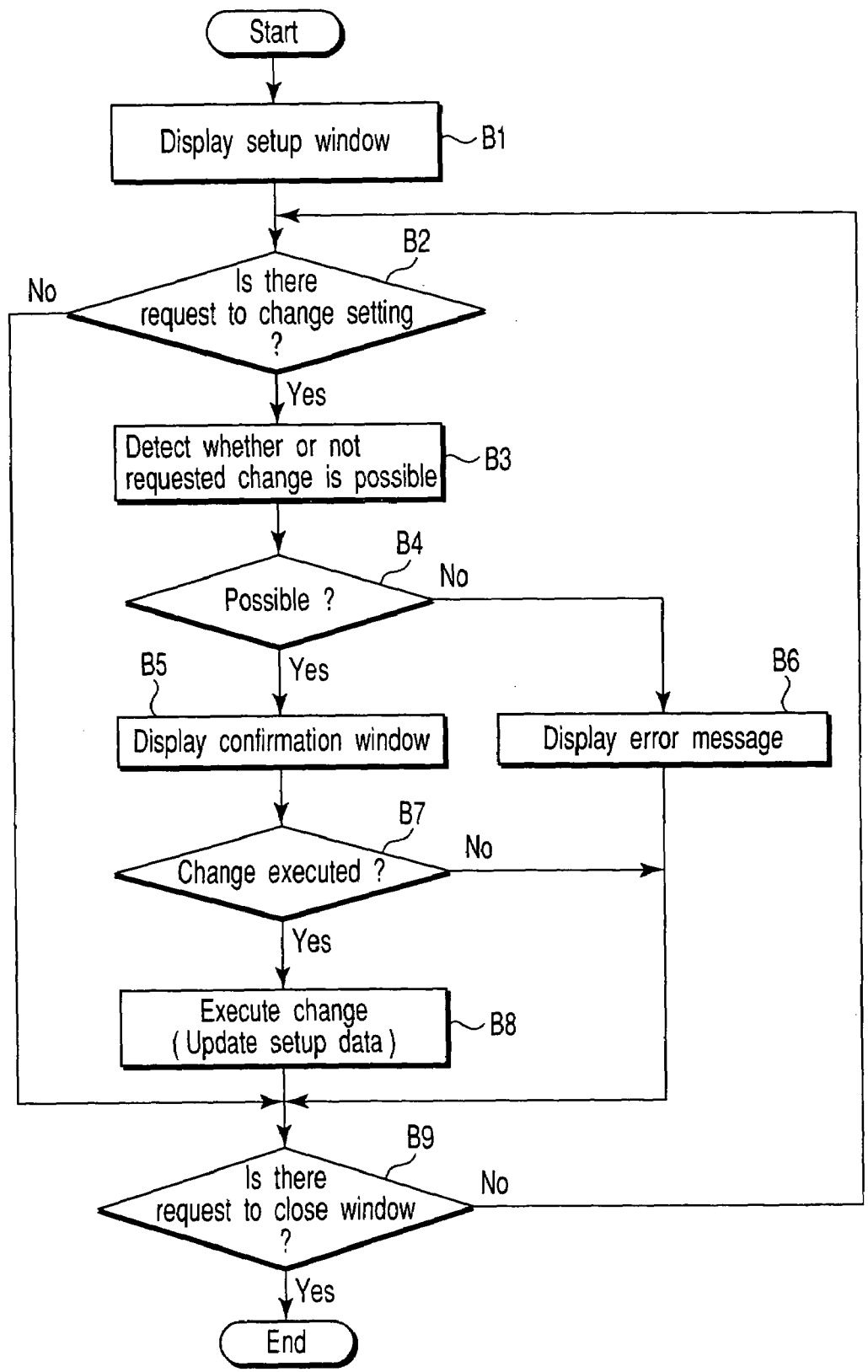
FIG. 18 is a flowchart illustrating, in detail, the control of various types of setting executed at step A7 of FIG. 17.

FIG. 18 is a flowchart illustrating, in detail, the control of various types of setting executed at step A7 of FIG. 17.

Firstly, the power supply management utility displays a setup window for performing setting corresponding to the clicked position (step B1). If a request to change data is made in the setup window (YES in step B2), the power supply management utility determines whether or not such a change is possible, referring to, for example, values held in the register 161 (step B3).

If the change is possible (YES in step B4), the power supply management utility displays a confirmation window that permits users to confirm the execution of the change (step B5). On the other hand, if it is impossible (NO at step B4), the power supply management utility displays an error message (step B6). Further, if the execution of the change is requested (YES in step B7), the power supply management utility executes the change (step B8).

If a request to close the setup window is made (YES in step B9), the power supply management utility closes the setup window and again displays the power-supply/charge state display window.

So far, the power-supply/charge state display window displayed on the LCD 141 by the power supply management utility has been described. However, in the electronic apparatus system, the power supply controller 16 also can cause the sub-LCD 162 to display simple data related to the power-supply/charge state. FIG. 19 is a view illustrating plain display examples displayed by the power supply controller 16 on the sub-LCD 162.

Since the display area of the sub-LCD 162 is small, the power supply controller 16 displays thereon required minimum information by changing the positions of the components (the electronic apparatus 1, fuel cell unit 2 and secondary battery unit 3) in accordance with their power-supply/charge states.

Figure 19A:
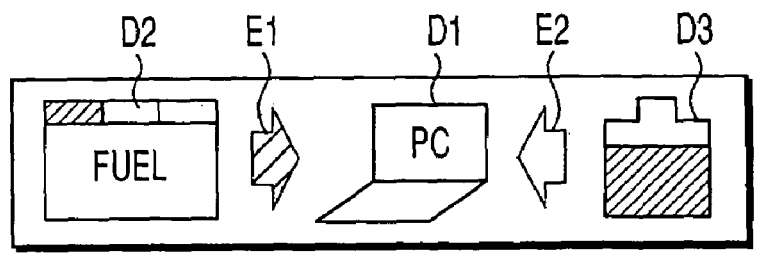
FIGS. 19A to 19C are view illustratings plain display examples displayed on a sub-LCD by the power supply controller of the electronic apparatus system.
Figure 19B:
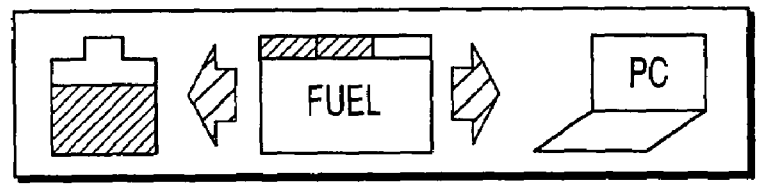
Figure 19C:
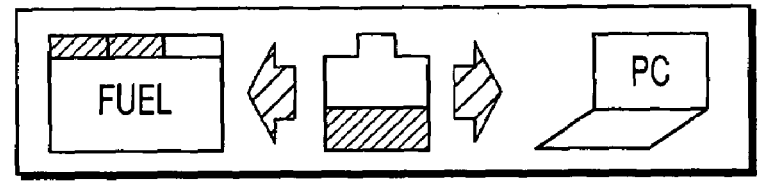

FIGS. 19A to 19C show plain display examples obtained when the AC cord is not connected, i.e., the electronic apparatus 1 is powered by a battery or fuel cell. FIG. 19A illustrates the case where the electronic apparatus 1 is powered by a battery or fuel cell. FIG. 19B illustrates the case where the secondary battery unit is charged with the power from the cell. FIG. 19C illustrates the case where the DMFC 22 is activated by the battery.

In the case FIG. 19A, since one of the fuel cell unit 2 or secondary battery unit 3 supplies power to the electronic apparatus 1, a component D1 indicative of the apparatus 1 is positioned in the middle position, and components D2 and D3 indicative of the fuel cell unit 2 and secondary battery unit 3, respectively, are positioned at the opposite sides of the component D1. Further, arrows E1 an E2 are attached to express the state where one of the fuel cell unit 2 and secondary battery unit 3 supplies power to the electronic apparatus 1. In the shown example, the fuel cell unit 2 is supplying power to the apparatus 1.

In the case FIG. 19B, since the fuel cell unit 2 supplies power to the electronic apparatus 1 and secondary battery unit 3, it is positioned in the middle position, and the apparatus 1 and unit 3 are positioned at the opposite sides of the unit 2.

In the case FIG. 19C, since the secondary battery unit 3 supplies power to the electronic apparatus 1 and fuel cell unit 2 (i.e., the DMFC 22 of the unit 2), it is positioned in the middle position, and the apparatus 1 and unit 2 are positioned at the opposite sides of the unit 3.

Figure 20:
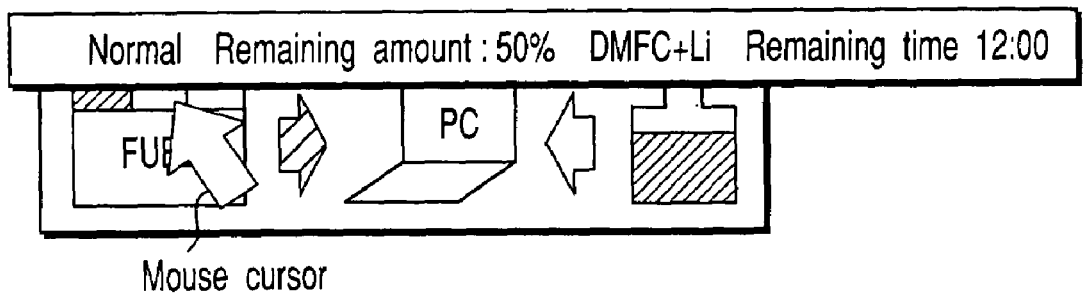
FIG. 20 shows an information example displayed on the sub-LCD of the electronic apparatus system when a cursor is put on the display.

The above-described manner of plain display employed for display on the sub-LCD 162 by the power supply controller 16 is also applicable to reduced display on the LCD 141 by the power supply management utility. Specifically, the manner of plain display can be also employed in the case where users want to display required minimum information on the required minimum area on the LCD 141 if the power-supply/charge state display window shown in FIG. 6 cannot be displayed all the time. In this case, when the mouse cursor is put on one of the components, information display can also be performed as shown in FIG. 20.

Figure 21A:
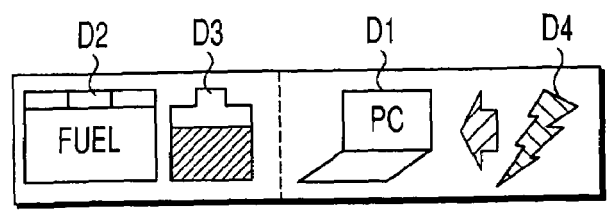
FIGS. 21A to 21E are view illustratings other plain display examples displayed on the sub-LCD by the power supply controller of the electronic apparatus system.
Figure 21B:
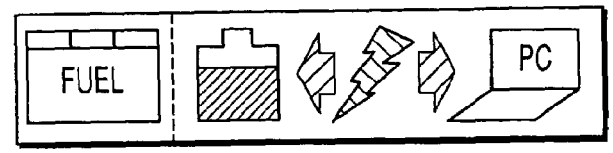
Figure 21C:
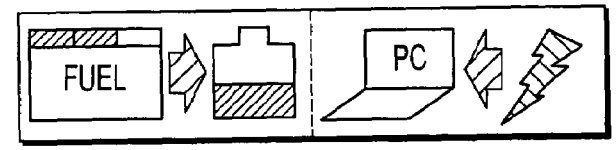
Figure 21D:
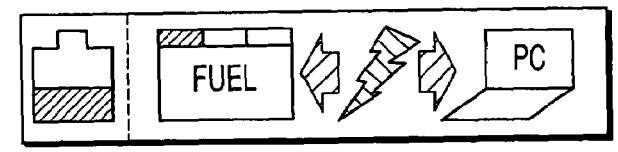
Figure 21E:
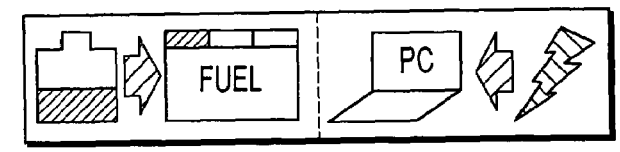

On the other hand, FIGS. 21A to 21E show plain display examples obtained when the AC cord is connected, i.e., the electronic apparatus 1 is AC-powered. FIG. 21A illustrates the case where the electronic apparatus 1 is powered by the AC power. FIG. 21B illustrates the case where the secondary battery unit 3 is charged with the AC power. FIG. 21C illustrates the case where the secondary battery unit 3 is charged with the power from the fuel cell unit 2, and the AC power is supplied to the electronic apparatus 1. FIG. 21D illustrates the case where the AC power is supplied to the electronic apparatus 1 and fuel cell unit 2. FIG. 21E illustrates the case where the DMFC 22 is activated by the secondary battery unit 3.

In the case where the AC cord is connected, the electronic apparatus 1, fuel cell unit 2 and secondary battery unit 3 are positioned in accordance with their power-supply/charge states too. Additionally, if no AC power is supplied to the fuel cell unit 2 and secondary battery unit 3, and one of these units is used in preference to the other, the one unit is positioned closer to the electronic apparatus 1 than the other.

In the case FIG. 21A, since the AC power is supplied from the AC power supply to the electronic apparatus 1, the arrow directed from a component D4 indicative of the AC power supply to the component D1 indicative of the apparatus 1 is displayed. In this case, the fuel cell unit 2 or secondary battery unit 3 does not operate.

In the case FIG. 21B, since the AC power is supplied to the electronic apparatus 1, and is also accumulated in the secondary battery unit 3, the arrows directed from the component D4 to the components D1 and D3 are displayed.

In the case FIG. 21C, since the AC power is supplied to the electronic apparatus 1, and the secondary battery unit 3 is charged with the power from the fuel cell unit 2, the arrow directed from the component D4 to the component D1 is displayed to indicate the supply of the AC power to the apparatus 1, and the arrow directed from the component D2 to the component D3 is displayed to indicate the charge of the secondary battery unit 3.

In the case FIG. 21D, since the AC power is supplied to the electronic apparatus 1, and to the auxiliary machine or internal secondary battery 23 of the DMFC 22 in the fuel cell unit 2, the arrow directed from the component D4 to the components D1 and D2 is displayed.

In the case FIG. 21E, since the AC power is supplied to the electronic apparatus 1, and the power from the secondary battery unit 3 is supplied to the auxiliary machine or internal secondary battery 23 of the DMFC 22 in the fuel cell unit 2, the arrow from the component D4 to the component D1 is displayed to indicate the supply of the AC power to the apparatus 1, and the arrow from the component D3 to the component D2 is displayed to indicate the charge of the fuel cell unit 2.

Although in the above-described embodiment, LCDs (such as LCD 141 and sub-LCD 162) are used as display devices, the invention is not limited to them. The power-supply/charge state can also be displayed by, for example, lighting an Light Emitting Diode (LED).

Figure 22:
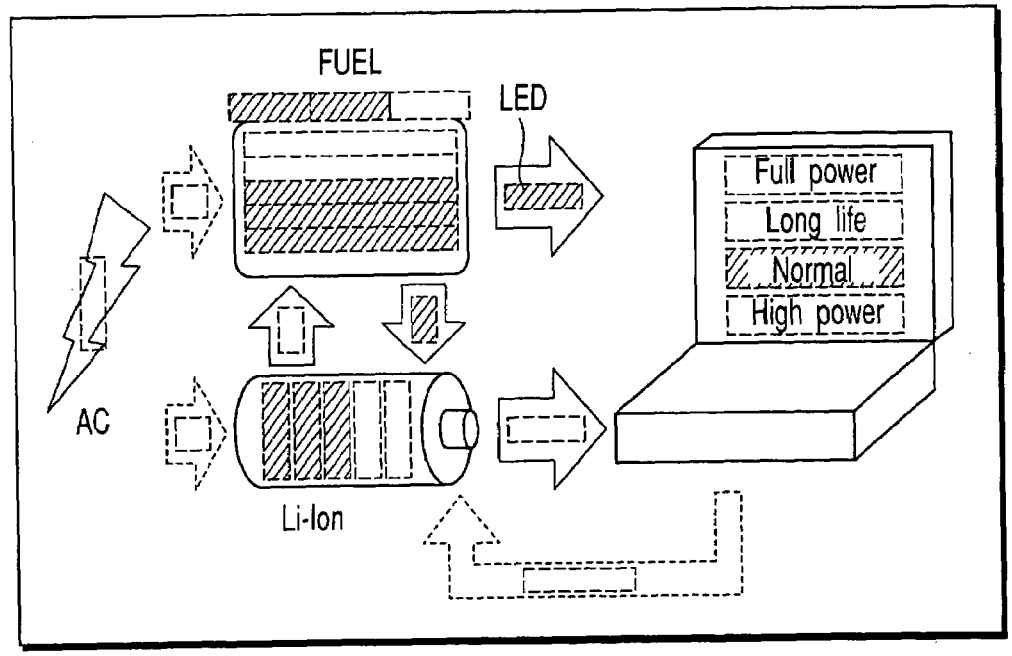
FIG. 22 is a view for explaining the case where the electronic apparatus system displays the power-supply/charge state by lighting an LED.

For example, the same information display as the above can be realized by printing the components, arrows, etc. on the casing of the electronic apparatus 1 or fuel cell unit 2 as shown in FIG. 22, and burying LCDs in the portions needed to be displayed.

Additional advantages and modifications will readily occur to those skilled in the art. Therefore, the invention in its broader aspects is not limited to the specific details and representative embodiments shown and described herein. Accordingly, various modifications may be made without departing from the is spirit or scope of the general inventive concept as defined by the appended claims and their equivalents.

What is claimed is:

1. An electronic apparatus comprising:
   a main unit;
   a first cell unit equipped with a fuel cell which supplies power to the main unit;
   a second cell unit equipped with a secondary battery which supplies power to the main unit; and
   a display unit configured to display a power-supply state among the main unit, the first cell unit, and the second cell unit, by forming and displaying a screen image on which a first image indicating the first cell unit, a second image indicating the second cell unit, and a third image indicating the main unit are arranged in accordance with the power-supply state, a power-supply image indicating the power-supply state being disposed between adjacent two images.

2. An electronic apparatus comprising:
   a main unit;
   a first cell unit equipped with a fuel cell which supplies power to the main unit;
   a second cell unit equipped with a secondary battery which supplies power to the main unit;
   a setting unit configured to permit setting concerning supply of power from the first or second cell unit to the main unit; and
   a display unit displaying a state of supply of power from the first or second cell unit to the main unit, set by the setting unit,
   the first cell unit having an auxiliary mechanism used to supply fuel to the fuel cell, and a repeatedly chargeable/dischargeable secondary battery; and
   the setting unit performing setting as to which one of the secondary battery of the first cell unit and the second cell unit should supply power to the auxiliary mechanism during activation of the fuel cell.

3. The electronic apparatus according to claim 2, further comprising:
   a pointing device which can operate a mouse cursor displayed on the display unit, and wherein:
   the setting unit can display, on the display unit, a first image indicating the first cell unit, and a second image indicating the second cell unit; and
   power is supplied from the secondary battery of the first cell unit to the auxiliary mechanism when the first image is selected by the mouse cursor operated by the pointing device, and power is supplied from the second cell unit to the auxiliary mechanism when the second image is selected by the mouse cursor.

4. An electronic apparatus comprising:
   a main unit;
   a first cell unit equipped with a fuel cell which supplies power to the main unit;
   a second cell unit equipped with a secondary battery which supplies power to the main unit;
   a setting unit configured to permit setting concerning supply of power from the first or second cell unit to the main unit;
   a display unit displaying a state of supply of power from the first or second cell unit to the main unit, set by the setting unit; and
   a pointing device which operates a mouse cursor displayed on the display unit, the setting unit displaying, on the display unit, a first image indicating the first cell unit, a second image indicating the second cell unit, a third image indicating the main unit, a first power supply image indicating supply of power from the first cell unit to the main unit, and a second power supply image indicating supply of power from the second cell unit to the main unit;

the setting unit starting the supply of power from the first or second cell unit to the main unit, when the pointing device is operated to cause the mouse cursor to select the first or second power supply image.

5. An electronic apparatus comprising:
a main unit;
a first cell unit equipped with a fuel cell which supplies power to the main unit;
a second cell unit equipped with a secondary battery which supplies power to the main unit;
a setting unit configured to permit setting concerning supply of power from the first or second cell unit to the main unit; and
a display unit displaying a state of supply of power from the first or second cell unit to the main unit, set by the setting unit,
the first cell unit controlling an amount of output power of the fuel cell in stages; and
the setting unit displaying the amount of output power of the first cell unit, and changing the amount of output power.

6. An electronic apparatus comprising:
a main unit;
a first cell unit equipped with a fuel cell which supplies power to the main unit;
a second cell unit equipped with a secondary battery which supplies power to the main unit;
a setting unit configured to permit setting concerning supply of power from the first or second cell unit to the main unit;
a display unit displaying a state of supply of power from the first or second cell unit to the main unit, set by the setting unit; and
a power input unit configured to receive power from outside, and
the setting unit displaying which one of the first cell unit and the power input unit is charging the secondary battery of the second cell unit, and determining which one of the first cell unit and the power input unit should charge the secondary battery.

7. An electronic apparatus comprising:
a main unit;
a first cell unit equipped with a fuel cell which supplies power to the main unit;
a second cell unit equipped with a secondary battery which supplies power to the main unit;
a setting unit configured to permit setting concerning supply of power from the first or second cell unit to the main unit; and
a display unit displaying a state of supply of power from the first or second cell unit to the main unit, set by the setting unit;
the setting unit displaying, on the display unit, an image indicating the first and second cell units, and an image indicating the supply of power from the first or second cell unit, and
the setting unit determining a position of the first or second image on a basis of states of use of the first and second cell units.

8. A computer comprising:
a computer main unit;
a first cell unit equipped with a fuel cell which can supply power to the computer main unit;
a second cell unit equipped with a secondary battery which can supply power to the computer main unit;
a power input unit configured to input power from an outside to the computer main unit;
a display unit displaying a first image indicating the first cell unit, a second image indicating the second cell unit, and a third image indicating the power input unit;
a pointing device which can operate a mouse cursor displayed on the display unit; and
a control unit configured to supply power to the computer main unit from one of the first and second cell units when one of the first, second and third images is selected by the mouse cursor operated by the pointing device, the one of the first and second cell units corresponding to the selected one of the first to third images.

9. An electronic apparatus comprising:
a main unit;
a first cell unit equipped with a fuel cell which supplies power to the main unit;
a second cell unit equipped with a secondary battery which supplies power to the main unit;
a setting unit configured to permit setting concerning supply of power from the first or second cell unit to the main unit; and
a display unit displaying a state of supply of power from the first or second cell unit to the main unit, set by the setting unit,
the setting unit displaying whether or not the fuel cell is operating, and starting and stopping power generation of the fuel cell,
the setting unit displaying a time required for the fuel cell to reach a state in which the fuel cell supplies power to the main unit, when the fuel cell is instructed to generate power.

10. An electronic apparatus comprising:
a main unit;
a first cell unit equipped with a fuel cell which supplies power to the main unit;
a second cell unit equipped with a secondary battery which supplies power to the main unit;
a setting unit configured to permit setting concerning supply of power from the first or second cell unit to the main unit; and
a display unit displaying a state of supply of power from the first or second cell unit to the main unit, set by the setting unit,
the first cell unit having a power input unit configured to input power from an outside,
the setting unit displaying whether or not the power input unit inputs power, and an amount of the input power, and executing setting related to supply of power from the power input unit.

11. An electronic apparatus comprising:
a main unit;
a first cell unit equipped with a fuel cell which supplies power to the main unit;
a second cell unit equipped with a secondary battery which supplies power to the main unit;
a setting unit configured to permit setting concerning supply of power from the first or second cell unit to the main unit;

a display unit displaying a state of supply of power from the first or second cell unit to the main unit, set by the setting unit; and a pointing device which operates a mouse cursor displayed on the display unit, and the setting unit displaying, on the display unit, information indicating which one of the first and second cell units is supplying power, and performing switching between the first and second cell units;

the setting unit displaying, on the display unit, a first image indicating the first cell unit, and a second image indicating the second cell unit, the setting unit displaying a setup window for executing various types of setting related to the first and second cell units, when one of the first and second images is selected by the mouse cursor operated by the pointing device.

12. An electronic apparatus comprising:

a main unit;

a first cell unit equipped with a fuel cell which supplies power to the main unit;

a second cell unit equipped with a secondary battery which supplies power to the main unit;

a setting unit configured to permit setting concerning supply of power from the first or second cell unit to the main unit; and a display unit displaying a state of supply of power from the first or second cell unit to the main unit, set by the setting unit, the first cell unit having a chargeable/dischargeable secondary battery; and the setting unit executing setting as to whether or not power is to be supplied from the fuel cell and the secondary battery of the first cell unit to the main unit, if power consumed by the main unit is higher than maximum power generated by the fuel cell.

13. An electronic apparatus comprising:

a main unit;

a first cell unit equipped with a fuel cell which supplies power to the main unit;

a second cell unit equipped with a secondary battery which supplies power to the main unit;

a setting unit configured to permit setting concerning supply of power from the first or second cell unit to the main unit;

a display unit displaying a state of supply of power from the first or second cell unit to the main unit, set by the setting unit, and the setting unit displays, on the display unit, an image indicating the first and second cell units, and an image indicating the supply of power from the first or second cell unit, and the setting unit displaying, on the display unit, information indicating a current state of use of the first or second cell unit indicated by the first or second image, when the first or second image is selected by the mouse cursor operated by the pointing device.

14. The electronic apparatus according to claim 13, wherein the information indicating the current state of use includes a remaining amount of fuel in the fuel cell.

15. The electronic apparatus according to claim 13, wherein the information indicating the current state of use includes a period of time, in which the main unit is operable, left after power is supplied to the main unit from the first or second cell unit.

* * * * *